(12) United States Patent
Engel et al.

(10) Patent No.: US 7,206,368 B2
(45) Date of Patent: Apr. 17, 2007

(54) COMPENSATING JITTER IN DIFFERENTIAL DATA SIGNALS

(75) Inventors: Andy Engel, Portola Valley, CA (US); Janet L. Yun, Santa Clara, CA (US)

(73) Assignee: Avago Tehnologies Fiber IP (Singapore) Pte. Ltd., Singapore (SG)

( * ) Notice: Subject to any disclaimer, the term of this patent is extended or adjusted under 35 U.S.C. 154(b) by 766 days.

(21) Appl. No.: 10/284,216

(22) Filed: Oct. 30, 2002

(65) Prior Publication Data
US 2004/0086069 A1 May 6, 2004

(51) Int. Cl.
*H04L 25/00* (2006.01)
*H04L 25/40* (2006.01)
*H04L 7/00* (2006.01)

(52) U.S. Cl. ..................... 375/371; 375/226

(58) Field of Classification Search ............... 375/371, 375/226, 335, 228, 229, 230, 232
See application file for complete search history.

(56) References Cited

U.S. PATENT DOCUMENTS

| | | | |
|---|---|---|---|
| 4,975,634 A | | 12/1990 | Shohet |
| 5,124,849 A | * | 6/1992 | Chur ........................... 360/31 |
| 5,384,769 A | * | 1/1995 | Oprescu et al. ............. 370/276 |
| 5,488,310 A | * | 1/1996 | Baker et al. ................ 324/648 |
| 5,608,757 A | * | 3/1997 | Smith et al. ................ 375/229 |
| 5,663,942 A | | 9/1997 | Ishibashi et al. |
| 5,717,716 A | * | 2/1998 | Doyle ........................ 375/232 |
| 5,828,238 A | * | 10/1998 | Bailleul et al. ................ 327/3 |
| 6,084,931 A | | 7/2000 | Powell, II et al. |
| 6,100,724 A | | 8/2000 | Yoshimura et al. |
| 6,278,755 B1 | | 8/2001 | Baba et al. |
| 6,430,696 B1 | | 8/2002 | Keeth |
| 6,438,178 B1 | * | 8/2002 | Lysdal et al. ............... 375/317 |
| 6,618,448 B1 | * | 9/2003 | Ootuka et al. .............. 375/319 |
| 6,791,369 B1 | * | 9/2004 | Hattori ........................ 327/52 |
| 6,803,795 B2 | * | 10/2004 | Nakajima et al. ............. 327/67 |
| 2001/0012320 A1 | * | 8/2001 | Watanabe et al. ........... 375/226 |
| 2005/0163207 A1 | * | 7/2005 | Buckwalter et al. ........ 375/229 |

FOREIGN PATENT DOCUMENTS

EP 1 096 263 A2 5/2001

OTHER PUBLICATIONS

Hewlett-Packard application notes entitled "Frequency Agile Jitter Measurement System," Apr. 1995, 28 pgs.
University of New Hampshire webpage: Chapter 1, http://www.iol.unh.edu/training/tokenring/vjs_thesis/index.html, entitled "Reliable Measurements of Clock Jitter in Token Ring Local Area Networks", May 1995, 7 pgs.
Maxim application notes entitled "Jitter Specifications Mady Easy: A Heuristic Discussion of Fibre Channel and Gigabit Ethernet Methods", Feb. 6, 2001, 6 pgs.

(Continued)

*Primary Examiner*—Jean B Corrielus (57) ABSTRACT

A method for compensating jitter in received differential data signals includes recovering a first clock signal from the received differential data signals. Re-timed differential data signals are generated based on the received differential data signals and the first clock signal. A level of jitter in the re-timed differential data signals is detected. A second clock signal is recovered from the re-timed differential data signals. Jitter-compensated differential data signals are generated based on the re-timed differential data signals, the second clock signal, and the detected level of jitter.

19 Claims, 6 Drawing Sheets

OTHER PUBLICATIONS

Ron Bertrand, webpage: http://www.radioelectronicschool.com, entitled "Online Radio & Electronics Course", Apr. 2002, 9 pgs.

Agilent Technologies product note entitled "Jitter Analysis Techniques Using an Agilent Infinilum Oscilloscope", May 1, 2002, 11 pgs.

Raul Land, wesite: http://www.elin.ttu.ee/mesel_www_home/Library/PROC/BEC/ASM91/LAND/LAND.HTM, entitled "Phase and Frequency Stability of PLL Systems", 2001, 7 pgs.

CommsDesign website: http://commsdesign.com/printableArticle?doc_id= OGE2001022S0087, entitled "Random Jitter—What is Really Going On?", Oct. 22, 2001, 7 pgs.

Planet Analog website: http://planetanalog.com/printableArticle?doc_idOEG20010827S0037, entitled "Synchand Clock Recovery—An Analog Guru Looks at Jitter", Aug. 27, 2001, 10 pgs.

Working draft entitled "Information Technology—Fibre Channel—Methodologies for Jitter and Signal Quality Specification—MJSQ", Aug. 3, 2002, 111 pgs.

Tektronix application note entitled "Analyzing Jitter Using a Spectrum Approach", Mar. 2002, 8 pgs.

Combined European Search and Examination Report (3 pgs).

* cited by examiner

COMPENSATING JITTER IN DIFFERENTIAL DATA SIGNALS

THE FIELD OF THE INVENTION

The present invention generally relates to jitter compensation, and more particularly to compensating jitter in differential data signals.

BACKGROUND OF THE INVENTION

A typical synchronous data communication system includes a transmitter, a communication channel, and a receiver. In such a system, the receiver should be able to reliably decode the information transmitted by the transmitter over the channel. To do this, the receiver samples the incoming signal at appropriate instants and makes various decisions. The clock used by the transmitter to transmit the data signal is typically referred to as the "reference" clock. A clock recovery circuit, such as a phase lock loop (PLL), is typically used in the receiver to extract the timing information from the phase of the incoming data. This clock is typically referred to as the "recovered" clock. For minimum bit errors, the recovered clock should closely match the reference clock.

However, noise on the channel and imperfections in the receiver cause phase variations in the incoming data signal. This in turn causes phase variations in the recovered clock with respect to the reference clock, and increases the probability of errors occurring. This phase variation or fluctuation in the significant instances of the data signal is referred to as jitter.

Jitter is a phase variation and is typically measured either in radians at a specified frequency or in time. Jitter is short-term, non-cumulative variations of the significant instants of a digital signal from their ideal positions in time. The significant instant may be any convenient, easily identifiable point on the signal such as the rising or falling edge of a pulse or the sampling instant. Jitter amplitude is traditionally measured in unit intervals (UI), where one UI is the phase deviation of one clock period. The peak-to-peak UI deviation of the phase function with respect to time is referred to as the jitter amplitude.

Controlling jitter is important because jitter can degrade the performance of a transmission system, introducing bit errors and uncontrolled slips in the digital signals. Jitter causes bit errors by preventing the correct sampling of the digital signal by the clock recovery circuit. The effective management of jitter is important to produce a system with an acceptable bit-error-ratio.

SUMMARY OF THE INVENTION

One form of the present invention provides a method for compensating jitter in received differential data signals. A first clock signal is recovered from the received differential data signals. Re-timed differential data signals are generated based on the received differential data signals and the first clock signal. A level of jitter in the re-timed differential data signals is detected. A second clock signal is recovered from the re-timed differential data signals. Jitter-compensated differential data signals are generated based on the re-timed differential data signals, the second clock signal, and the detected level of jitter.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
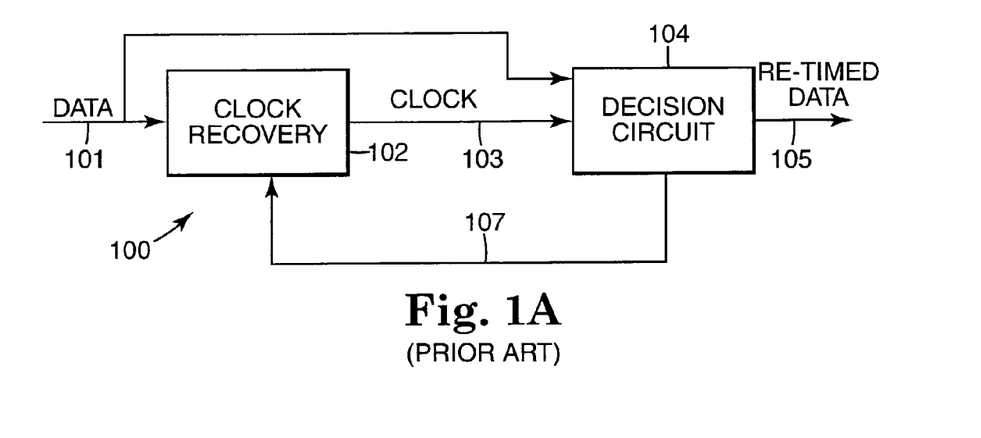
FIG. 1A is a block diagram illustrating a prior art receiver for a synchronous communication system.

FIG. 1A is a block diagram illustrating a prior art receiver 100 for a synchronous communication system. Receiver 100 includes clock recovery block 102 and decision circuit 104. Clock recovery block 102 is a phase lock loop that receives incoming data 101 and generates a clock signal 103 based on the phase of the incoming data 101. The clock signal 103 generated by clock recovery block 102 is referred to as the recovered clock, and is output to decision circuit 104. Decision circuit 104 receives the incoming data 101 and the recovered clock 103 and quantizes the amplitude of the data signal at precise sample instants. Decision circuit 104 outputs re-timed data 105, and also provides a feed-back signal 107 to clock recovery block 102.

Figure 1B:
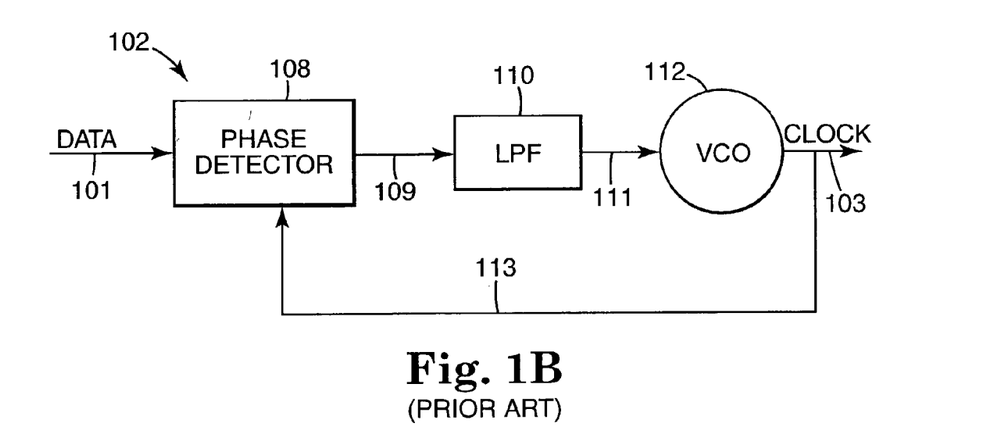
FIG. 1B is a block diagram illustrating the clock recovery block from FIG. 1A in additional detail.

FIG. 1B is a block diagram illustrating the clock recovery block 102 from FIG. 1A in additional detail. Clock recovery block (phase lock loop) 102 includes phase detector 108, low-pass filter (LPF) 110 and voltage-controlled oscillator (VCO) 112. Phase detector 108 detects the phase or frequency difference between the incoming signal 101 and the clock signal 103 being fed back to the phase detector 108 on feedback line 113, and outputs a corresponding phase signal 109 to low-pass filter 110. Low-pass filter 110 integrates the phase signal 109 received from phase detector 108 and outputs a DC control voltage 111 to voltage-controlled oscillator 112 that controls the frequency of the clock signal 103 output by voltage-controlled oscillator 112.

Jitter causes the effective bit period of received data signals to change. The use of a clock recovery circuit and a decision circuit, such as circuits 102 and 104 shown in FIG. 1A, allows the receiver to stay synchronized with the transmitter despite the presence of some jitter. However, there are limits on the speed and magnitude of the jitter that can be handled by such prior art circuits. As described in further detail below, one embodiment of the present invention provides additional jitter compensation, thereby further enhancing signal quality and reducing bit errors.

Figure 2:
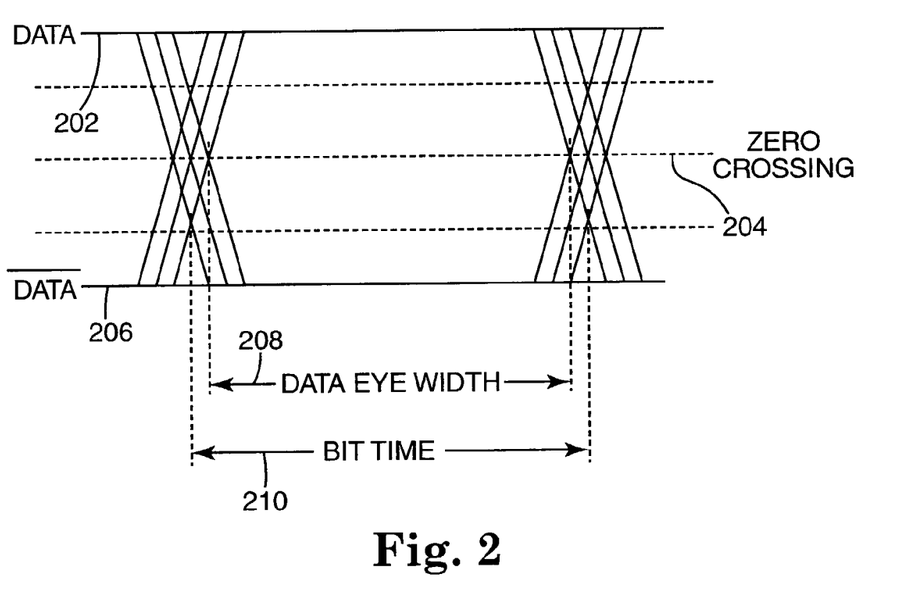
FIG. 2 is a data eye diagram illustrating a plurality of jittered differential signals superimposed on one another.

FIG. 2 is a data eye diagram illustrating a plurality of jittered differential signals 202 and 206 superimposed on one another. The data 202 and data-bar 206 differential signals transition from high-to-low and low-to-high as shown in FIG. 2. Ideally, with no jitter, the differential signals would be symmetrical and would intersect at the zero crossing 204 at times corresponding to the bit time 210. Ideally, the differential signals 202 and 206 should overlap each other. However, as shown in FIG. 2, due to jitter, the differential signals 202 and 206 are spaced apart and transition at varying points in time.

As the data transfer rate of a communication system increases, the duration for which each signal is valid decreases by a corresponding amount. More specifically, the data window or "eye" for each of the data signals decreases at higher data transfer rates. The data eye for the signals indicates the actual duration that the signals are valid after jitter of the signal is considered. As shown in FIG. 2, jitter reduces the data eye width 208 of the signals (which would be the same as the bit time 210 with no jitter) and thereby reduces the valid duration during which each of the signals may be successfully captured.

Figure 3:
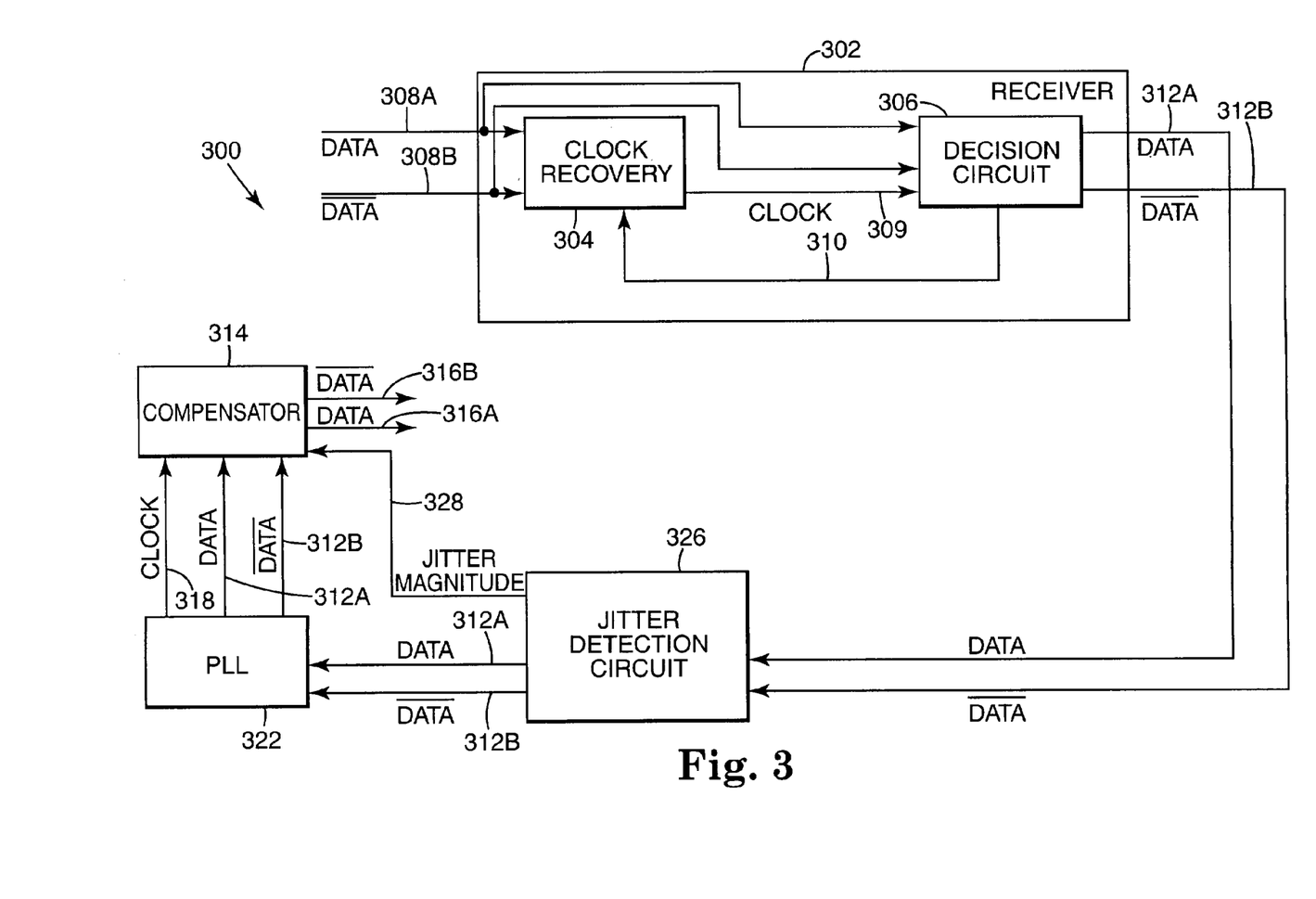
FIG. 3 is a block diagram illustrating a receiver system that detects and compensates jitter according to one embodiment of the present invention.

FIG. 3 is a block diagram illustrating a receiver system 300 that detects and compensates jitter according to one embodiment of the present invention. Receiver system 300 includes receiver 302, compensator 314, phase-lock-loop (PLL) 322, and jitter detection circuit 326.

In one embodiment, receiver 302 is a conventional differential signal receiver for a synchronous communication system. Receiver 302 includes clock recovery block 304 and decision circuit 306. Clock recovery block 304 is a phase lock loop that receives incoming data 308A and data-bar 308B differential signals from a transmitter (not shown), and generates a recovered clock signal 309 based on the phase of the incoming signals 308A and 308B. The recovered clock signal 309 is output to decision circuit 306. Decision circuit 306 receives the incoming data 308A and data-bar 308B differential signals and the recovered clock 309, and quantizes the amplitude of the signals 308A and 308B at precise sample instants. Decision circuit 306 outputs re-timed data 312A and data-bar 312B signals, and also provides a feedback signal 310 to clock recovery block 304. In one embodiment, decision circuit 306 is implemented with a master/slave D-type flip-flop.

Receiver 302 provides some jitter compensation. However, the data 312A and data-bar 312B signals output from receiver 302 will typically still have some jitter. Further jitter compensation is provided by jitter detection circuit 326, phase lock loop 322, and compensator 314. Jitter detection circuit 326 receives the data 312A and data-bar 312B signals from receiver 302, and detects the magnitude of the jitter in the received signals. Jitter detection circuit 326 outputs a jitter magnitude signal 328 to compensator 314 that is indicative of the level or magnitude of the detected jitter. Jitter detection circuit 326 also outputs the data 312A and data-bar 312B differential signals to phase lock loop 322.

Phase lock loop 322 generates a recovered clock signal 318 based on the phase of the incoming data 312A and data-bar 312B signals. In one embodiment, phase lock loop 322 is a low-jitter "golden" phase lock loop that meets tight performance and calibration specifications, such as those specified in "Information Technology-Fibre Channel-Methodology of Jitter Specification", standard NCITS TR-25-1999, Sep. 1, 1999, available from the InterNational Committee for Information Technology Standards (INCITS).

The recovered clock signal 318 is a very low-jitter clock signal. Phase lock loop 322 outputs the recovered clock 318, and the data 312A and data-bar 312B differential signals, to compensator 314.

In one embodiment, compensator 314 compensates the jitter in the received data 312A and data-bar 312B differential signals based on the jitter magnitude signal 328 and the clock signal 318 as described in further detail below, and outputs jitter-compensated data 316A and data-bar 316B signals. In one form of the invention, compensator 314 is implemented with commercially available test equipment, such as a bit error rate tester (BERT), a digital communications analyzer, and/or a digital oscilloscope. In one embodiment, compensator 314 is implemented with an Agilent DCA 86100A digital oscilloscope and an Anritsu MP 1632A digital data analyzer. In one form of the invention, the clock signal 318 generated by phase lock loop 322 is used as a triggering signal to trigger the digital communications analyzer. In yet another embodiment, receiver system 300 could be implemented as an integrated circuit. The functions performed by compensator 314 and jitter detection circuit 326 are described in further detail below with reference to FIGS. 4 and 5.

Figure 4:
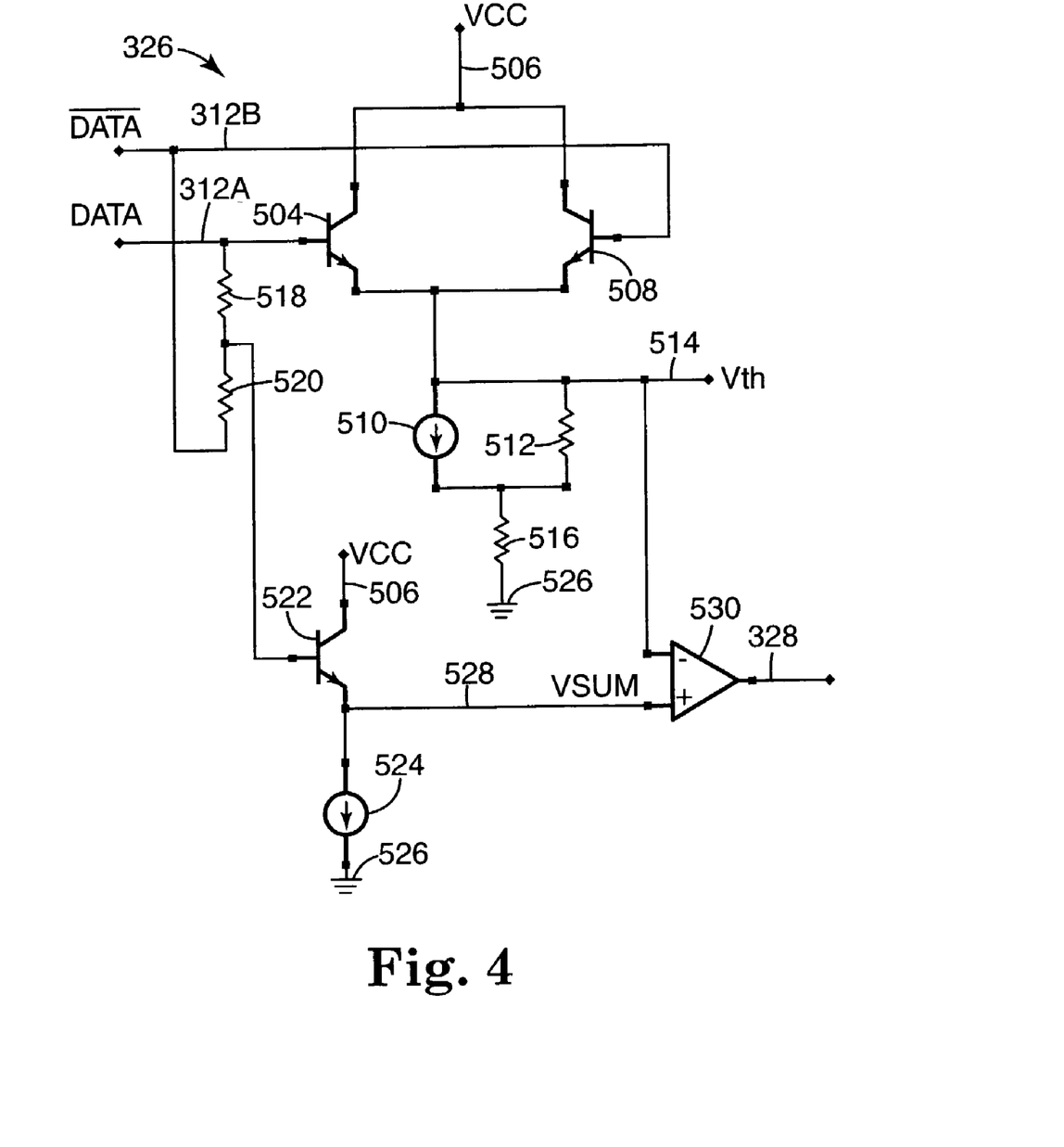
FIG. 4 is an electrical schematic diagram illustrating a jitter detection circuit according to one embodiment of the present invention.

FIG. 4 is an electrical schematic diagram illustrating the jitter detection circuit 326 (shown in block form in FIG. 3) according to one embodiment of the present invention. Circuit 326 includes resistors 518 and 520, transistors 504 and 508, current source 510, resistors 512 and 516, transistor 522, current source 524, and comparator 530. In one embodiment, transistors 504, 508, and 522 are bipolar junction transistors. The inputs to circuit 326 are data 312A and data-bar 312B inputs, which are the outputs of decision circuit 306 (shown in FIG. 3). Data-bar input 312B is connected to resistor 520 and to the base of transistor 508. Data input 312A is connected to resistor 518 and to the base of transistor 504. Transistors 504 and 508 are configured as a differential pair, with the collectors of transistors 504 and 508 connected to a voltage supply (VCC) 506, and the emitters of transistors 504 and 508 connected together and to current source 510. In one embodiment, VCC 506 is three volts. In an alternative embodiment, VCC 506 is five volts. Current source 510 is connected in parallel with resistor 512 between resistor 516 and the emitters of transistors 504 and 508. Resistor 516 is connected to ground 526. In one embodiment, resistors 512, 516, 518, and 520 are each fifty ohm resistors.

The base of transistor 522 is connected to the node between resistors 518 and 520. The collector of transistor 522 is coupled to VCC 506. Current source 524 is connected between the emitter of transistor 522 and ground 526.

In one embodiment, resistors 518 and 520 are balanced resistors (e.g., 50 ohms each), and the voltage at the node between resistors 518 and 520 (i.e., the node connected to the base of transistor 522) is the average voltage of the data 312A and data-bar 312B signals. The average voltage of the data signal 312A and the data-bar signal 312B is sensed at the base of transistor 522, which acts as a buffer. A voltage (VSUM) 528 is sensed by comparator 530 at the emitter of transistor 522. VSUM 528 is a voltage that is indicative of the average voltage of the data signal 312A and the data-bar signal 312B. For example, if data 312A is one volt and data-bar 312B is minus one volt, VSUM 528 will be zero volts. If data 312A is two volts and data-bar 312B is zero volts, VSUM 528 will be one volt.

If no jitter is present, the data 312A and the data-bar 312B signals will be symmetrical and VSUM 528 will have a constant ideal value. The ideal value is the mid-point value between data 312A and data-bar 312B when these signals are not switching (e.g., when data 312A is a logic high and data-bar 312B is a logic low). If jitter is present, the data 312A and data-bar 312B signals will not be symmetrical, and VSUM 528 will depart from the ideal value.

Transistors 504 and 508, current source 510, and resistors 512 and 516, form a differential mode output stage. The output of this stage, which is threshold voltage (Vth) 514, is a balanced average of the data 312A and data-bar 312B signals. This output stage essentially filters jitter from the data 312A and data-bar 312B signals, so that Vth 514 will be a substantially constant voltage level representing the average of the "steady-state" values of data 312A and data-bar 312B. The steady-state values of the data 312A and data-bar 312B signals are the values of these signals when the signals are a logic high and a logic low and are not switching.

Comparator 530 compares VSUM 528 and Vth 514 and outputs a jitter magnitude signal 328, which is a voltage level that varies in magnitude based on the amount of jitter in the received data 312A and data-bar 312B signals. In one embodiment, comparator 530 subtracts Vth 514 from VSUM 528, and jitter magnitude signal 328 represents the difference between these two voltages. If there is no jitter in the signal, Vth 514 and VSUM 528 will be equal, and jitter magnitude signal 328 will be zero.

Figure 5:
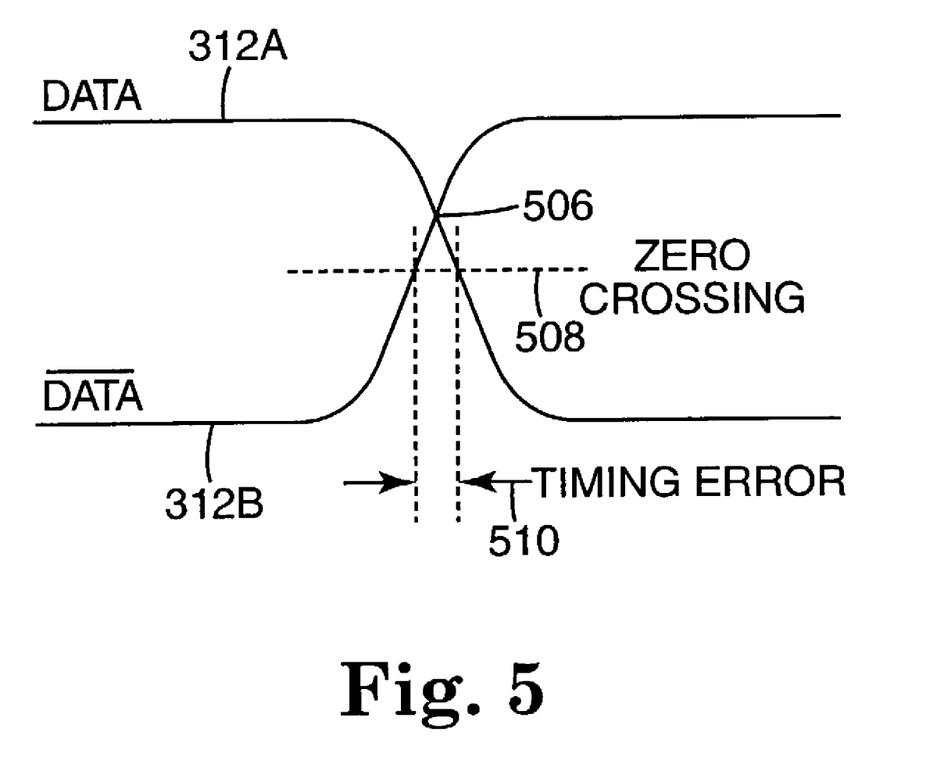
FIG. 5 is a timing diagram illustrating differential signals with a timing error caused by jitter.

FIG. 5 is a timing diagram illustrating data 312A and data-bar 312B differential signals with a timing error 510 caused by jitter. With no jitter, the data 312A and data-bar 312B signals would intersect at the zero crossing 508. However, as shown in FIG. 5, jitter has caused the data signal 312A to begin transitioning low later than the data-bar signal 312B begins transitioning high. The result is that the data 312A and data-bar 312B signals intersect at a point 506 above the zero crossing 508. This non-ideal transition of the data 312A and data-bar 312B signals results in a timing error 510. The term "zero crossing" is used herein to indicate an ideal intersection point for the differential signals 312A and 312B, and is not limited to zero volts. For example, if the data 312A and data-bar 312B signals have a DC offset, the ideal intersection point of the signals may not be at zero volts.

The amount that the actual intersection 506 of the data 312A and data-bar 312B signals deviates from the ideal intersection at the zero crossing 508 depends on the amount of jitter, which is represented by jitter magnitude signal 328. As the jitter level increases, the distance between the actual intersection 506 and the ideal intersection also increases. In one embodiment, compensator 314 re-times the data 312A and data-bar 312B signals based on clock signal 318, and adjusts the rise times and fall times of the data 312A and data-bar 312B waveforms based on the jitter magnitude signal 328 so that the signals 312A and 312B intersect at the zero crossing 508 and are symmetrical about the zero crossing 508. The compensated data 312A and data-bar 312B signals are represented in FIG. 3 by jitter-compensated data 316A and data-bar 316B signals, which are output from compensator 314.

Figure 6:
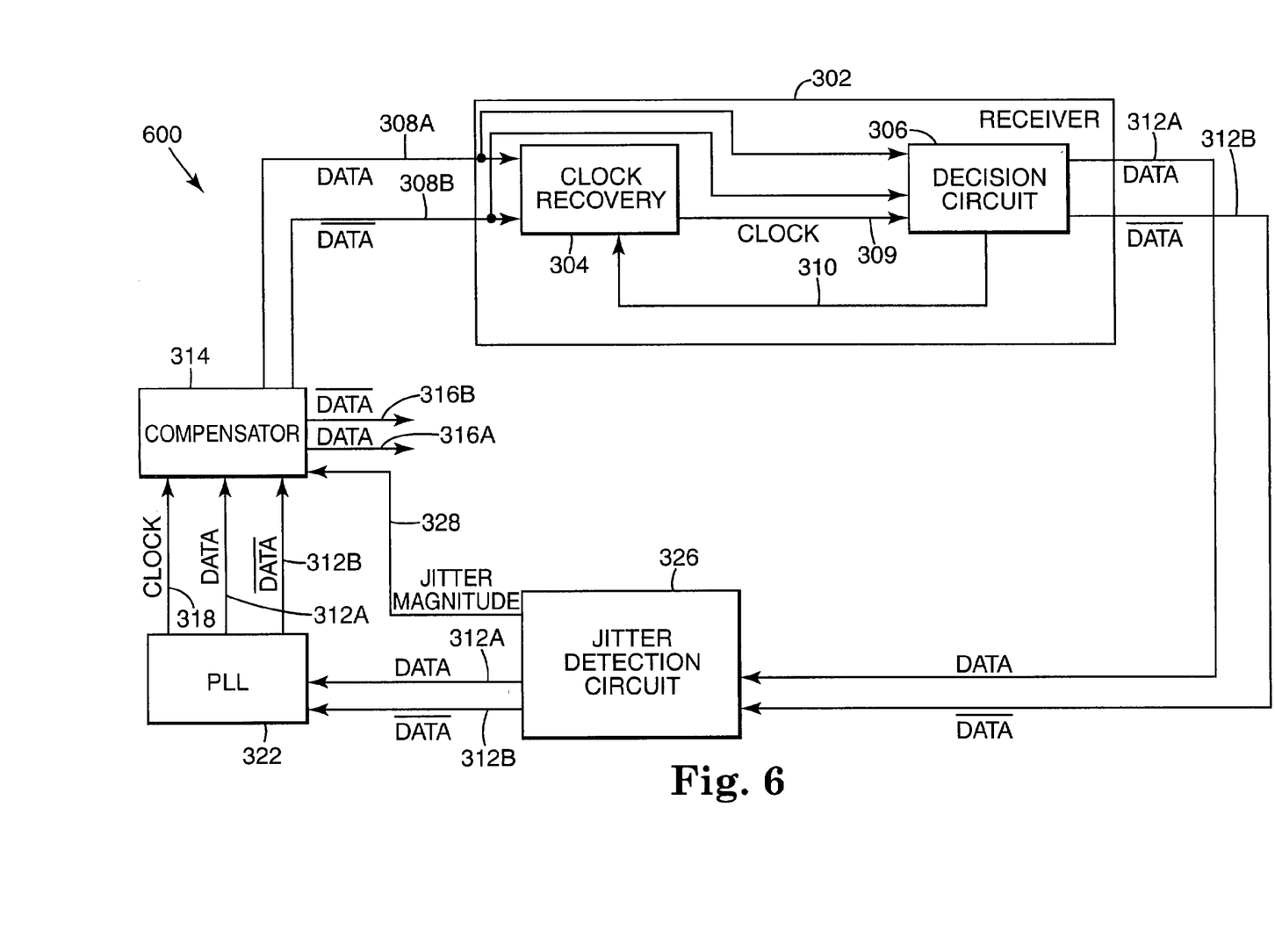
FIG. 6 is a block diagram illustrating a testing system that detects and compensates jitter according to one embodiment of the present invention.

In one form of the present invention, the jitter detection and compensation techniques described herein may be used as part of a testing system. FIG. 6 is a block diagram illustrating a testing system 600 that detects and compensates jitter according to one embodiment of the present invention. As shown in FIG. 6, testing system 600 is configured in essentially the same manner as receiver system 300 (shown in FIG. 3), with the exception that compensator 314 is coupled to receiver 302 in testing system 600. In testing system 600, compensator 314 is configured to generate a sequence of data 308A and data-bar 308B signals for testing purposes. In one embodiment, compensator 314 is coupled to receiver 302 via a "golden" SMA coaxial cable to minimize asymmetrical path delays and transmission line reflections. Receiver 302 in system 600 represents a device-under-test (DUT). In testing system 600, in addition to being configured to generate jitter-compensated data 316A and data-bar 316B signals as described above, compensator 314 is also configured to perform various conventional tests on the data 312A and data-bar 312B signals received from the device-under-test (i.e., receiver 302), such as calculating bit error ratios, jitter statistics, as well as performing other tests.

Embodiments of the present invention provide numerous advantages over prior art systems. In one embodiment, jitter is detected and compensated to provide enhanced signal performance and integrity, improved measurement accuracy of the device under test (DUT), and easy correlation of different test equipment. In one embodiment, the jitter detection and compensation scheme can be integrated as part of a high-volume manufacturing process.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for compensating jitter in received differential data signals, the method comprising:
   recovering a first clock signal from the received differential data signals;
   generating re-timed differential data signals based on the received differential data signals and the first clock signal;
   detecting a jitter level in the re-timed differential data signals;
   recovering a second clock signal from the re-timed differential data signals; and
   generating jitter-compensated differential data signals based on the re-timed differential data signals, the second clock signal, and the detected jitter level.

2. The method of claim 1, wherein the step of generating jitter-compensated differential data signals comprises:
   adjusting the timing of the re-timed differential data signals based on the second clock signal; and
   adjusting waveform intersections of the re-timed differential data signals to an ideal intersection point based on the detected jitter level, wherein the waveform intersections are points of intersection of the re-timed differential data signals.

3. The method of claim 2, wherein the waveform intersections are adjusted by adjusting rise and fall times of the re-timed differential data signals.

4. The method of claim 1, wherein the second clock signal is recovered with a low-jitter phase lock loop.

5. The method of claim 1, wherein the step of detecting a jitter level in the re-timed differential data signals comprises:
   detecting average values of the re-timed differential data signals; and comparing the detected average values with a threshold value, wherein the comparison indicates the jitter level in the re-timed differential data signals.

6. The method of claim 5, wherein the average values of the re-timed differential data signals are detected with a pair of balanced serially connected resistors, and a transistor coupled to a node between the pair of resistors.

7. The method of claim 5, further comprising:
detecting the threshold value with a differential mode output stage including a differential pair of transistors, the differential mode output stage configured to receive the re-timed differential data signals and output the threshold value.

8. The method of claim 7, wherein the threshold value is a substantially constant voltage level representing an average of the steady-state values of the re-timed differential data signal.

9. A system for compensating jitter in received differential data signals, the system comprising:
a receiver for recovering a first clock signal from the received differential data signals, and generating re-timed differential data signals based on the first clock signal;
a jitter detection circuit for detecting a magnitude of jitter in the re-timed differential data signals;
a phase lock loop for recovering a second clock signal from the re-timed differential data signals; and
a jitter compensator for generating jitter-compensated differential data signals by modifying the re-timed differential data signals based on the second clock signal and the detected magnitude of jitter.

10. The system of claim 9, wherein the jitter compensator is configured to modify the timing of the re-timed differential data signals based on the second clock signal, and modify waveform intersections of the re-timed differential data signals to an ideal intersection point based on the detected magnitude of jitter, wherein the waveform intersections are points of intersection of the re-timed differential data signals.

11. The system of claim 10, wherein the jitter compensator is configured to modify the waveform intersections by adjusting rise and fall times of the re-timed differential data signals.

12. The system of claim 9, wherein the phase lock loop is a low-jitter phase lock loop.

13. The system of claim 9, wherein the jitter detection circuit comprises:
a first sub-circuit for detecting average values of the re-timed differential data signals;
a second sub-circuit for detecting a threshold value representing an average of the steady-state values of the re-timed differential data signals; and
a comparator for comparing the detected average values with the threshold value and outputting a jitter magnitude signal based on the comparison.

14. The system of claim 13, wherein the first sub-circuit comprises:
a pair of balanced serially connected resistors; and
a transistor coupled to the comparator and to a node between the pair of resistors, wherein the re-timed differential data signals are applied to the pair of serially connected resistors and the average values are output by the transistor to the comparator.

15. The system of claim 13, wherein the second sub-circuit comprises:
a differential mode output stage including a differential pair of transistors, the differential mode output stage configured to receive the re-timed differential data signals and output the threshold value to the comparator.

16. A jitter detection circuit comprising:
a first and a second input for receiving differential data signals;
a first sub-circuit coupled to the first and the second inputs for detecting average values of the differential data signals, wherein the first sub-circuit comprises:
a first resistor connected between the first input and a first node, and a second resistor connected between the second input and the first node;
a transistor having a base connected to the first node and a collector configured to be connected to a voltage supply; and
a current source coupled between an emitter of the transistor and ground;
a second sub-circuit coupled to the first and the second inputs for detecting a threshold value representing an average of the steady-state values of the differential data signals; and
a comparator coupled to the first and the second sub-circuits for comparing the detected average values with the detected threshold value and outputting a jitter signal based on the comparison, the jitter signal indicating a level of jitter in the received differential data signals.

17. The jitter detection circuit of claim 16, wherein the comparator is coupled to the first sub-circuit at a node between the current source and the emitter of the transistor.

18. A jitter detection circuit comprising:
a first and a second input for receiving differential data signals;
a first sub-circuit coupled to the first and the second inputs for detecting average values of the differential data signals;
a second sub-circuit coupled to the first and the second inputs for detecting a threshold value representing an average of the steady-state values of the differential data signals, wherein the second sub-circuit comprises:
a first transistor having a base connected to the first input;
a second transistor having a base connected to the second input, the first and the second transistors each having a collector configured to be connected to a voltage supply, the first and the second transistors each having an emitter, the emitter of the first transistor connected to the emitter of the second transistor; and
a current source coupled between ground and the emitters of the first and the second transistors;
a comparator coupled to the first and the second sub-circuits for comparing the detected average values with the detected threshold value and outputting a jitter signal based on the comparison, the jitter signal indicating a level of jitter in the received differential data signals.

19. The jitter detection circuit of claim 18, wherein the comparator is coupled to the second sub-circuit at a node between the current source and the emitters of the first and the second transistors.

* * * * *

UNITED STATES PATENT AND TRADEMARK OFFICE
CERTIFICATE OF CORRECTION

PATENT NO. : 7,206,368 B2  
APPLICATION NO. : 10/284216  
DATED : April 17, 2007  
INVENTOR(S) : Andy Engel Page 1 of 1

It is certified that error appears in the above-identified patent and that said Letters Patent is hereby corrected as shown below:

Col. 1 Line 1 Delete "Tehnologies" and insert -- Technologies --, therefor.

Col. 7 Line 18 In Claim 8, Delete "signal." and insert -- signals. --, therefor.

Signed and Sealed this

Twenty-third Day of December, 2008

JON W. DUDAS  
*Director of the United States Patent and Trademark Office*